(12) United States Patent
Jackson

(10) Patent No.: US 10,469,437 B2
(45) Date of Patent: Nov. 5, 2019

(54) NOTIFICATIONS BASED ON USER ACTIVITY ON THIRD-PARTY WEBSITES

(71) Applicant: Facebook, Inc., Menlo Park, CA (US)

(72) Inventor: Dean Jackson, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 56 days.

(21) Appl. No.: 15/365,517

(22) Filed: Nov. 30, 2016

(65) Prior Publication Data

US 2018/0152410 A1    May 31, 2018

(51) Int. Cl.
*G06F 15/16* (2006.01)
*H04L 12/58* (2006.01)
*H04L 29/08* (2006.01)

(52) U.S. Cl.
CPC .............. *H04L 51/32* (2013.01); *H04L 51/24* (2013.01); *H04L 67/02* (2013.01); *H04L 67/20* (2013.01); *H04L 67/26* (2013.01); *H04L 67/306* (2013.01)

(58) Field of Classification Search
CPC ......... H04L 51/32; H04L 67/20; H04L 67/26; H04L 67/306; H04L 67/02

USPC ........................................................ 709/206
See application file for complete search history.

(56) References Cited

U.S. PATENT DOCUMENTS

| | | | |
|---|---|---|---|
| 6,862,575 B1* | 3/2005 | Anttila | G06Q 30/02 705/14.14 |
| 2013/0179271 A1* | 7/2013 | Adams | G06Q 50/01 705/14.66 |
| 2016/0063529 A1* | 3/2016 | Roeding | G06Q 30/00 705/14.13 |

* cited by examiner

*Primary Examiner* — Atta Khan
(74) *Attorney, Agent, or Firm* — Baker Botts L.L.P.

(57) ABSTRACT

In one embodiment, a method includes sending notifications to one or more users of a social-networking system. Information may be received regarding actions taken by the users of the social-networking system. The information may include parameters associated with each of the actions taken by the users. The method further includes determining correlations between the parameters and the users, and sending notifications to the users of the social-networking system based on the determined correlations.

13 Claims, 4 Drawing Sheets

NOTIFICATIONS BASED ON USER ACTIVITY ON THIRD-PARTY WEBSITES

TECHNICAL FIELD

This disclosure generally relates to sending notifications to users of a social-networking system based on their actions on third-party websites.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a method includes receiving information regarding actions taken by one or more users of a social-networking system on one or more third-party websites, determining one or more parameters associated with each of the actions taken by the one or more users on the one or more third-party websites, determining one or more correlations between the one or more parameters and the one or more users, and sending notifications to the one or more users based on the determined correlations.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
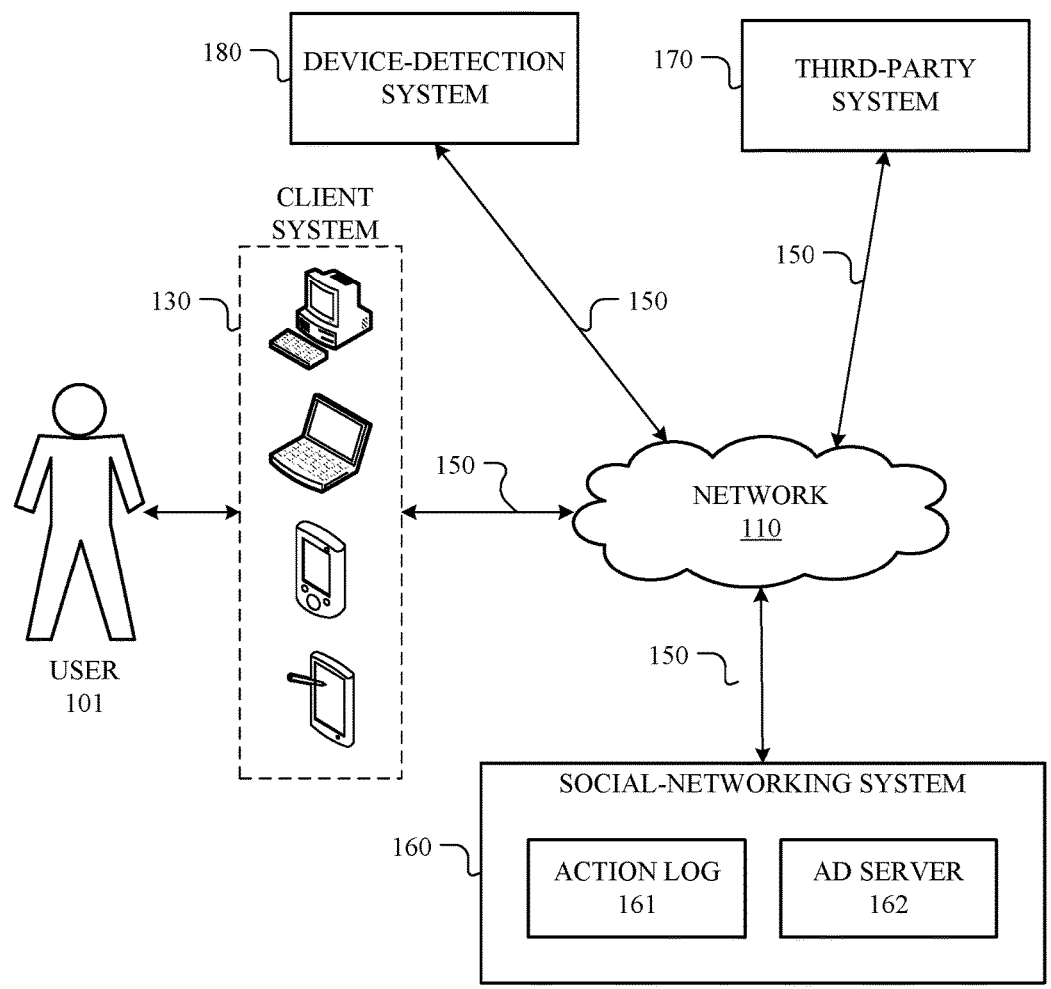
FIG. 1 illustrates an example network environment associated with a social-networking system.

FIG. 1 illustrates an example network environment 100 associated with a social-networking system. Network environment 100 includes a user 101, a client system 130, a social-networking system 160, a third-party system 170, and a device-detection system 180 connected to each other by a network 110. Although FIG. 1 illustrates a particular arrangement of user 101, client system 130, social-networking system 160, third-party system 170, device-detection system 180, and network 110, this disclosure contemplates any suitable arrangement of user 101, client system 130, social-networking system 160, third-party system 170, device-detection system 180, and network 110. As an example, two or more of client system 130, social-networking system 160, third-party system 170, and device-detection system 180 may be connected to each other directly, bypassing network 110. As another example, two or more of client system 130, social-networking system 160, third-party system 170, and device-detection system 180 may be physically or logically co-located with each other in whole or in part. Moreover, although FIG. 1 illustrates a particular number of users 101, client systems 130, social-networking systems 160, third-party systems 170, device-detection systems 180, and networks 110, this disclosure contemplates any suitable number of users 101, client systems 130, social-networking systems 160, third-party systems 170, device-detection systems 180, and networks 110. As an example, network environment 100 may include multiple users 101, client system 130, social-networking systems 160, third-party systems 170, device-detection systems 180, and networks 110.

In particular embodiments, user 101 may be an individual (human user), an entity (e.g., an enterprise, business, or third-party application), or a group (e.g., of individuals or entities) that interacts or communicates with or over social-networking system 160 or with third-party system 170 using client system 130. In particular embodiments, client system 130 may be a network-addressable computing system (e.g., a computer system similar to computer system 400 of FIG. 4) that may access one or more aspects of social-networking system 160 and third-party system 170.

In particular embodiments, social-networking system 160 may be a network-addressable computing system (e.g., a computer system similar to computer system 400 of FIG. 4) hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate.

In particular embodiments, third-party system 170 may be a network-addressable computing system (e.g., a computer system similar to computer system 400 of FIG. 4) that can host one or more websites for accessing by one or more users such as user 101 using a client system such as client system 130. In addition, third-party system 170 may generate, store, receive, and send information related to the actions taken by user 101 on third-party system 170 to social-networking system 160, such as, for example, information related to actions performed by user 101 on one or more websites of third-party system 170 using client system 130 in response to notifications (e.g., advertisements) presented to user 101 via social-networking system 160. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example, client system 130 may access third-party system 170 via social-networking system 160. Client system 130 may be any suitable computing device, such as, for example, a personal computer, a laptop computer, a cellular telephone, a smartphone, a tablet computer, or an augmented/virtual reality device.

In particular embodiments, device-detection system 180 may be a network-addressable computing system (e.g., a computer system similar to computer system 400 of FIG. 4) that may generate, store, receive, and send device-related data, such as, for example, device attributes and other suitable data related to client system 130. As an example, device-detection system 180 may implement one or more models or algorithms to identify a device platform (e.g., whether client system 130 is a desktop computer, laptop computer, smartphone, tablet computer, or other type of computing device), or device attributes (e.g., physical characteristics and technical capabilities of client system 130) in response to a request received at device-detection system 180 (or received at another systems, e.g., social-networking system 160 or third-party system 170, that can access the device-detection system 180). In particular embodiments, the model or algorithm implemented by device-detection system 180 may use a machine-learned scoring formula, which the scoring algorithm may obtain automatically from a set of training data constructed from pairs of requests for content objects and selected types of client systems 130, where appropriate. Device-detection system 180 may be accessed by the other components of network environment 100 either directly or via network 110. The device-detection system 180 may be physically or logically co-located with another system (such as, for example, a social-networking system 160, third-party system 170, a third-party application server, a web server, an enterprise server, or another suitable system) in whole or in part. As an example, the device-detection system 180 may receive a request for a content object from a client system 130. The device-detection system 180 may access information about user 101 of client system 130, such as, for example, survey information from user 101, information received from other applications on the client system 130, social-networking information related to user 101, or other relevant information about user 101. The device-detection system 180 may then use information in the http-header received with the request, along with information about user 101 of client system 130, to determine one or more attributes of client system 130. The device-detection system 180 may use one or more models or algorithms to predict or otherwise identify the attributes. A content object that has been customized based on the attributes of the client system 130 may then be sent. Although this disclosure describes determining the attributes of client systems 130 in a particular manner, this disclosure contemplates determining that attributes of client systems 130 in any suitable manner.

In particular embodiments, the device-detection system 180 may receive a request for a content object from a client system 130 of a user. The request may be for any suitable type of content object, such as, for example, a webpage, multimedia content, other suitable network-based resources, or any combination thereof. The request may include an http-header. The http-header may include a variety of header field that define the operating parameters of the HTTP transaction. As an example, the http-header may include a user-agent string that describes one or more attributes of the browser client on the client system 130 making the request for the content object. As another example, the http-header may include an accept string that describes the types of content that are acceptable. As yet another example, the http-header may include an accept-encoding string that describes the types of encodings that are acceptable. Three example http-headers are provided below:

(1) Example http-header from a desktop computer using a FIREFOX browser client:
User agent: Mozilla/5.0 (Macintosh; Intel Mac OS X 10.8; rv:15.0)
Gecko/20100101 Firefox/15.0.1
Accept: text/html,application/xhtml+xml,application/xml;q=0.9,*/*;q=0.8
Accept encoding: gzip, deflate.

(2) Example http-header from a desktop computer using a CHROME browser client:
User agent: Mozilla/5.0 (Macintosh; Intel Mac OS X 10_8_2)
AppleWebKit/537.4 (KHTML, like Gecko) Chrome/22.0.1229.79 Safari/537.4
Accept: text/html,application/xhtml+xml,application/xml;q=0.9,*/*;q=0.8
Accept encoding: gzip, deflate, sdch.

(3) Example http-header from a mobile device using a SAFARI browser client:
User agent: Mozilla/5.0 (iPhone; CPU iPhone OS 6.0 like Mac OS X)
AppleWebKit/536.26 (KHTML, like Gecko) Version 6.0 Mobile/10A403

Safari/8536.25
Accept: text/html,application/xhtml+xml,application/xml;q=0.9,*/*;q=0.8
Accept encoding: gzip, deflate.

Although this disclosure describes receiving particular requests for content objects in a particular manner, this disclosure contemplates receiving any suitable request for content objects in any suitable manner.

In particular embodiments, the device-detection system 180 may access information describing user 101 of the client system 130. The information describing user 101 may include, for example, information received from the user's client system 130, survey information from the user 101, social-networking information related to the user 101, other suitable information about the user 101, or any combination thereof. Although this disclosure describes accessing particular information about users in a particular manner, this disclosure contemplates accessing any suitable information about users in any suitable manner.

In particular embodiments, the information describing the user 101 may include information received from client system 130. In response to the request for a content object from the client system 130, the device-detection system 180 may access or otherwise receive information form the client system 130 that describes the client system 130 or describes its attributes. As an example, the device-detection system 180 may determine one or more attributes of the client system 130 based on a browsing history associated with the user 101 (or the device) requesting a content object. The browsing history of user 101 may be determined by accessing, for example, tracking cookies, browser logs, cached webpages, tracking pixels, page tags, or other suitable browsing history data associated with the client system 130. Particular versions of content objects may be formatted/customized for devices with particular attributes. If the browsing history shows that the user has previously accessed such content objects, then the device-detection system 180 may determine that the client system 130 has one or more attributes associated with those previously accessed content objects. As another example, the device-detection system 180 may determine one or more attributes of the client system 130 based on information accessed from various applications installed on the client system 130. The client system 130 may have applications installed on it that can access, for example, the native APIs on the device, application reports, application logs, or other suitable information about the client system 130. The device-detection system 180 may be able to access the information from these applications in order to access information describing the client system 130. As yet another example, the device-detection system 180 may determine one or more attributes of the client system 130 based on cookies stored in association with a web browser of the client system 130. For example, an authentication cookie may be used to identify the user of the client system 130, or to directly identify the device. Although this disclosure describes receiving particular information from the client system 130 in a particular manner, this disclosure contemplates receiving any suitable information from the client system 130 in any suitable manner.

In particular embodiments, the information describing user 101 may include social-networking information related to user 101 of client system 130. The social-networking information related to user 101 may include, for example, user-profile data related to the user or other users of social-networking system 160, concept-profile data, social-graph information, other suitable data related to social-networking system 160, or any combination thereof. The device-detection system 180 may then determine one or more attributes of the client system 130 based on social-graph information corresponding to the user of the client system 130. In particular embodiments, the information describing the user may include information associated with a profile page of social-networking system 160 corresponding to user 101. The profile page of user 101 may include, for example, content, declarations, or other information provided by user 101 to social-networking system 160. As an example, the user's address/country of residence, mobile phone number, mobile-service provider information (for example, the user may explicitly list this in his profile, or "like" a concept-profile page associated with his mobile-service provider), employment information, or other suitable information may be included on the profile page of user 101. This information about the user may be useful for identifying particular attributes of client system 130. As an example, the device-detection system 180 may be able to access information identifying the mobile-service provider of the user and then access a list of mobile devices and/or device attributes commonly supported by the mobile-service provider, and then may use this list to predict the attributes of the user's client system 130. Although this disclosure describes receiving particular social-networking information from social-networking system 160 in a particular manner, this disclosure contemplates receiving any suitable social-networking information in any suitable manner.

In particular embodiments, the device-detection system 180 may determine one or more attributes of the client system 130 based on the http-header received with the request for a content object. In some cases, the http-header may explicitly identify some attributes of the client system 130. However, in many cases, not all relevant attributes are explicitly identified by the http-header. In these cases, the device-detection system 180 may use the information provided by the http-header, such as the user-agent string, browser-specific strings, or other relevant information, to determine the attributes that are relevant to formatting or customized the requested content object. The device-detection system 180 may use the http-header information to identify or predict the physical characteristics and technical capabilities (collectively "attributes") of the client system 130. As an example, the device-detection system 180 may determine one or more of the following attributes of the client system 130: programming language support (e.g., JavaScript support), style-sheet language support (e.g., CSS support level), screen size (e.g., the screen diagonal measurement, or the screen pixel resolution), screen pixel density, keyboard type (e.g., physical keyboard, touchscreen keyboard), location-services support (e.g., using one or more of cellular signals, Wi-Fi signals, or GPS to determine the location of the client system 130), wireless communication support (e.g., Wi-Fi, BLUETOOTH, NFC, IR), image support (e.g., ability to display JPEG, GIF, or PNG images), video support (e.g., ability to display various video types), or other suitable attributes. Determining whether a mobile device has each of these attributes may be useful in order to help customize or properly format the content objects requested by the mobile device. Although this disclosure describes determining attributes of a client system 130 based on particular http-headers in a particular manner, this disclosure contemplates determining attributes of client systems based on any suitable http-headers in any suitable manner. Moreover, although this disclosure describes determining particular attributes of a client system 130, this disclosure contemplates determining any suitable attributes of client systems.

In particular embodiments, the device-detection system 180 may determine one or more attributes of the client system 130 based on the accessed information describing the user of the client system 130. As described previously, information describing the user of a mobile device, such as, for example, information received from the user's mobile device, survey information from the user, social-networking information related to the user, other suitable information about the user, may be useful for determining various attributes about the user's mobile device. The device-detection system 180 may use information about the user of the client system 130 to identify or predict the physical characteristics and technical capabilities (such as, for example, as described previously) of the client system 130. As an example, the device-detection system 180 may receive information from an application installed on the client system 130 (e.g., FACEBOOK MOBILE APP) that describes some of the physical or technical features of the mobile device, which may be used to determine the attributes of the mobile device. As another example, the device-detection system 180 may receive information survey information from the user that describes the user's mobile device, which may be used to determine the attributes of the mobile device. Although this disclosure describes determining attributes of a client system 130 based on particular user information in a particular manner, this disclosure contemplates determining attributes of client systems based on any suitable user information in any suitable manner. Moreover, although this disclosure describes determining particular attributes of a client system 130, this disclosure contemplates determining any suitable attributes of client systems.

In particular embodiments, the device-detection system 180 may determine the attributes of a client system 130 using one or more models or algorithms to identify the attributes. The score may be, for example, a confidence score, a probability, a quality, a ranking, another suitable type of score, or any combination thereof. Thus, in particular embodiments, attributes having higher calculated scores may be more likely to be attributes actually possessed by the client system 130. As an example, the device-detection system 180 may calculate a probability score for one or more device attributes based on information in the http-header received from the client system 130 and information describing the user of the client system 130. The following is an example algorithm that device-detection system 180 could use to calculate a probability score for a particular attribute of a client system 130:

$$s_1 = f(H_1, \ldots, H_m, \ldots, U_1, \ldots, U_n)$$

where:
$s_1$ is the probability score for a first attribute,
$H_1, \ldots, H_m$ are http-header fields 1 through m, and
$U_1, \ldots, U_n$ are user-profile fields 1 through n.

Particular variables may be more useful for determining particular attributes. Although this disclosure describes calculating a score using particular variables, this disclosure contemplates calculating a score using any suitable variables. In particular embodiments, the model or algorithm implemented by the device-detection system 180 may use a machine-learned scoring formula. The scoring algorithm may obtain the scoring formula automatically from a set of training data constructed from data sets including information about, for example, requests for content objects (e.g., webpages) from mobile devices, various users of mobile devices, and various types of mobile devices. In particular embodiments, the device-detection system 180 may determine the attributes of a client system 130 by calculating a score for one or more attributes and then identifying each attribute having a score greater than a threshold score. In this way, the device-detection system 180 may be able to ensure a relatively high degree of accuracy for correctly identifying attributes of mobile devices. As an example, only attributes with a calculated probability score greater than 0.9 may be identified as being attributes of a client system 130. Although this disclosure describes determining particular attributes of a client system 130 in a particular manner, this disclosure contemplates determining any suitable attributes of client systems in any suitable manner.

In connection with device detection, particular embodiments may utilize one or more systems, components, elements, functions, methods, operations, or steps disclosed in U.S. patent application Ser. No. 13/721,900, filed 20 Dec. 2012, which is incorporated herein by reference.

This disclosure contemplates any suitable network 110. As an example, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, third-party system 170, and device-detection system 180 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, when a user performs an action on third-party system 170, such as a conversion, the action may be recorded in action log 161. As used herein, a "conversion" may refer to an action, especially an action taken on or at a third-party website, but also potentially an action taken within social-networking system 160 (e.g., an action within social-networking system 160 that indicates interaction/engagement with an advertised product or service after advertisement exposure), in which a user of the social-networking system 160 converts a transaction, registration, download, or other suitable action or event. For example, a "conversion" may include purchases of a product or gift card, placing a product in an online shopping cart or wishlist of a website, moving an item from the wishlist to the online shopping cart, registering for a service offered by the third-party website. Conversions may be further categorized in some embodiments. For example, purchases may be categorized by purchases in conjunction with a promotion, sale, ad, or other purchase incentive, purchases of a minimum dollar amount of goods or services on a website, purchases of a group of related items in response to a recommendation or other promotion, purchasing items using a particular payment method, or purchases of subscriptions (e.g., purchases that occur on a recurring basis). Conversions at third-party system 170 may be referred to as "external," as they occur external to social-networking system 160. However, conversions may also be "internal," and occur within social-networking system 160. For example, an "internal" conversion may include a user posting about a product advertised, becoming a fan or "liking" a product advertised, emailing or otherwise sharing a link to a friend with an advertised product.

Entries in action log 161 may include any suitable information for identifying and/or describing the actions taken by the user on third-party system 170. For example, in particular embodiments, an entry in action log 161 includes some or all of the following parameters:

Action ID: an unique identifier for the action taken

Time: a timestamp of when the action occurred

Location: an indication of a location at which the user converted (e.g., a geolocation of the user or client system 130)

Platform: an indication of the platform used by the user for the conversion (e.g., whether a desktop computer, laptop computer, smartphone, tablet computer, or other type of device was used)

User: an identifier (user ID) for the user who performed the action. (e.g., the user's profile identifier on social-networking system 160)

Site identifier: an identifier (e.g., domain) associated with third-party system 170

Action Type: an identifier for the type of action performed. (e.g., purchasing a product or placing the product into an online shopping cart)

Object: an identifier for an object acted on by the action (e.g., the product purchased or placed into the online shopping cart)

Value: a value of the object acted on by the action

Social-networking system 160 may learn of the user's actions on third-party system 170 via any of a number of methods. In particular embodiments, in response to certain actions such as, a user registering with third-party system 170, purchasing a product from a website hosted by third-party system 170, downloading a service from third-party system 170, or otherwise making a conversion, third-party system 170 transmits a conversion page, such as a confirmation or "thank you" page to the user at the user's client device. These pages may include an embedded call or code segment (e.g., JavaScript) in the HTML or other structured document code (e.g., in an HREF (Hypertext REFerence)). The embedded call or code segment may, when executed by the browser or other rendering application of client system 130, generate a tracking pixel or image tag that is then transmitted to social-networking system 160 (whether the user is logged into social-networking system 160 or not). The tracking pixel or image tag may communicate various information to social-networking system 160 about the user's action on third-party system 170. By way of example, the tracking pixel or call may transmit the parameters listed above as example entries in action log 161.

Using the information stored in action log 161, social-networking system 160 may generate future notifications (e.g., advertisements) to the users of social-networking system 160 that are more tailored to the users' behaviors and habits. The ads may be generated by ad server 162, in certain embodiments. For example, in certain embodiments, action log 161 may include information relating to conversions by users on third-party system 170, and ad server 162 may use the conversion information for users to determine the a user's conversion habits (e.g., when, where, and how the user tends to "convert") and send future advertisements to the user based on the user's conversion habits. Ad server 162 may look at one or more parameters involved in the conversions to determine the users' habits, such as a location of a user at when the conversion took place (e.g., whether the user was at home, at the office, or within a number of miles from a store), the time of day, the day of the week, and which platform (e.g., mobile, tablet, or desktop) the conversion took place from. As an example, if a user tends to convert advertisements viewed on social-networking system 160 on weekends, then ad server 162 may send future advertisements to the user that are concentrated during or near weekend days. As another example, if a user tends to convert advertisements on their mobile client system as opposed to their desktop client system, then ad server 162 may send more advertisements to the user that are concentrated on the mobile client system platform versus the desktop client system.

The parameters associated with the conversions may be determined using any suitable technique. For example, a user's location may be determined from the user's geolocation, which may be determined using a global positioning system (GPS) module coupled to client system 130, using wireless signal information (e.g., cell tower location information, or WI-FI hotspot location information), or any other technique. As another example, the day, date, and time information may be determined based on data stored at client system 130 (e.g., the day, date and time used by the operating system of client system 130), information from social-networking system 160, or information from third-party system 170. The user's platform may be determined using any suitable method, such as one or more of the methods disclosed above with respect to device-detection system 180.

In particular, embodiments, user conversion patterns may be analyzed for specific time periods (e.g., the most recent two days or two weeks). The time periods may be selected by social-networking system 160 or by the entity providing the notification. What qualifies as a "conversion" may depend on the type of notification in certain embodiments. In addition, a what qualifies as a "conversion" may depend on a third-party definition (e.g., given by third-party system 170 or the party providing the advertisement). As one example, a conversion may include a completed purchase after clicking through an advertisement presented to a user on social-networking system 160. As other examples, conversions may be defined as a user clicking through and viewing a product, adding a product to an online shopping cart, or accessing a coupon and using the coupon at a local store location.

In some embodiments, social-networking system 160 may be place users into groups that indicate like behavior. For instance, those users that tend to convert on weekends at home may be placed into a first group, while users that tend to convert at work during weekdays may be placed into a second group. The notifications sent by social-networking system 160 may then be sent to users according to their assigned grouping. Using the above example groups, notifications for users in the first group may be more concentrated on weekends when the user accesses social-networking system 160 from a device associated with the user's home (e.g., using geolocation data or other data gathered by device-detection system 180)

In some embodiments, a notification may have a fixed timeframe of relevance (e.g., for a sale offer, an expiring coupon, or a birthday notification). In such embodiments, the user patterns and habits may be analyzed to determine the best way to send notifications to the user during the fixed timeframe. For example, while a user may typically convert on weekends from home, the fixed timeframe may only include weekdays. Accordingly, social-networking system 160 may only analyze the user's conversion habits during the weekdays to determine an optimal time to send notifications rather than analyzing the user's overall conversion habits.

In some embodiments, notifications may have multiple formats associated therewith (e.g., the text used or the style of the notification may be different for the same ad campaign). In such embodiments, the user conversion patterns may be used to determine which of the multiple formats is most effective. Upon determining, for example, a most-converted format of the notifications, social-networking system 160 may send future notifications using mostly that format or only that format.

In some embodiments, notifications may be sent to multiple geographic locations (e.g., based on users' geolocations) or user demographics (e.g., based on user profile information). In such embodiments, user conversion data may be analyzed to determine which locations/demographics are more likely to convert (e.g., by comparing between the locations/demographics) or more effective in converting (e.g., comparing how many within the location/demographic group convert vs. the amount of notifications sent for that group), and future notifications may thus be concentrated toward those locations or demographics.

In particular embodiments, in connection with receiving and using conversion data, social-networking system 160 may utilize one or more systems, components, elements, functions, methods, operations, or steps disclosed in U.S. patent application Ser. No. 13/023,197, filed 8 Feb. 2011, which is incorporated herein by reference.

Although described below with regard to advertisements, it will be understood that aspects of the present disclosure may be used to send other types of notifications to users of social-networking system 160 based on their activity on third-party websites. For example, future notifications of friends' birthdays may be sent based on the user's birthday notification conversion habits (e.g., how the user converts a birthday notification to send a "Happy Birthday" message to a friend on their birthday).

Figure 2:
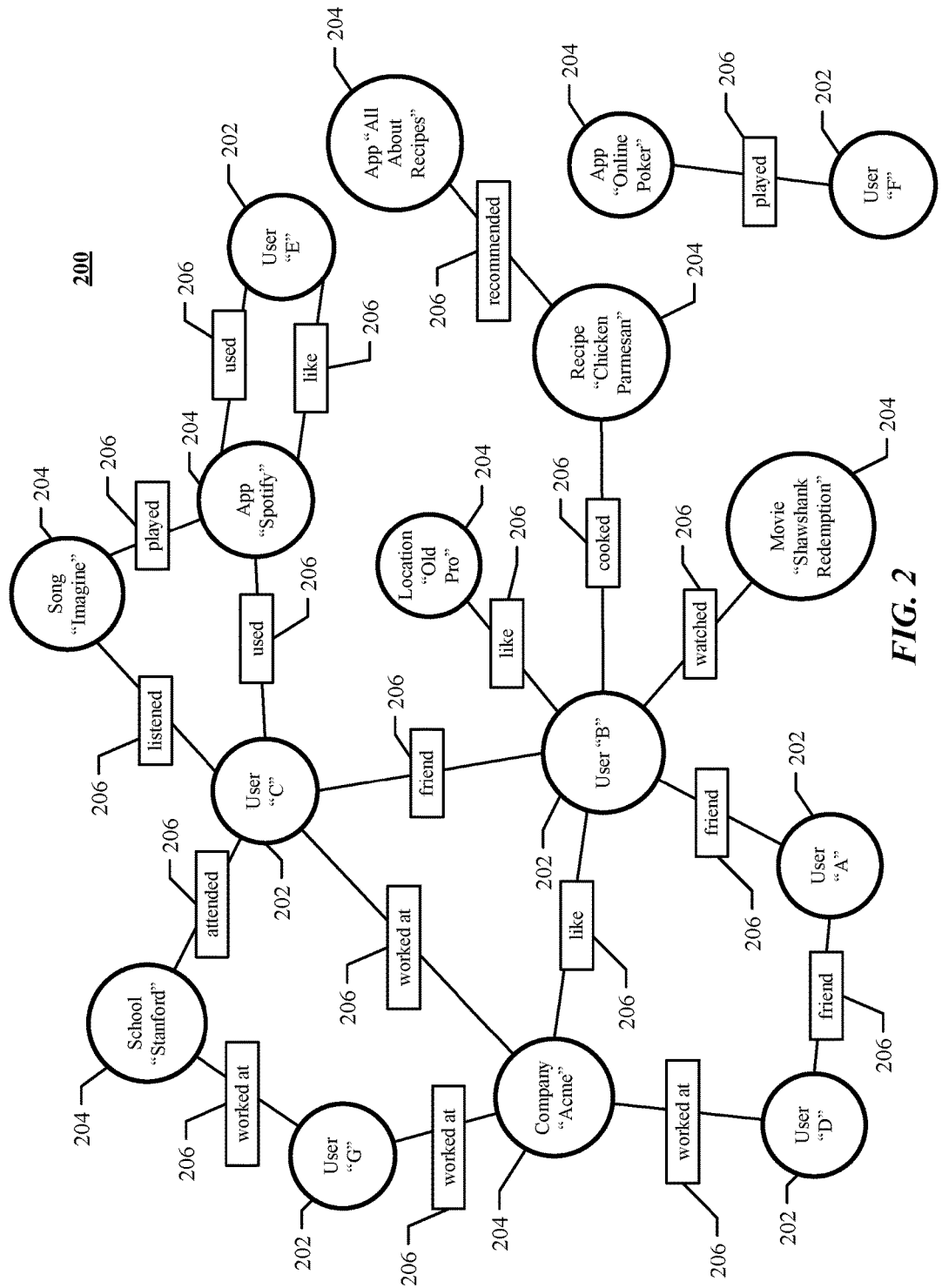
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example, a profile page corresponding to a particular external webpage may be the particular external webpage and the profile page may correspond to a particular concept node 204. Profile pages may be viewable by all or a selected subset of other users. As an example, a user node 202 may have a corresponding user-profile page in which the corresponding user may add content, make declarations, or otherwise express himself or herself. As another example, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

An advertisement generated and sent by social-networking system 160 (e.g., using ad server 162) may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social-networking system 160" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, in response to advertisements on social-networking system 160, users may be directed to third-party websites. Social-networking system 160 may receive messages from those third-party websites in response to actions taken by the users on the third-party websites. The messages may communicate certain factors or attributes associated with the actions taken by users while on the third-party websites. For example, when a user takes one or more certain actions on a third-party website such as, for example, making a purchase on the third-party website (e.g., in response to an advertisement), the third-party website may transmit a page, such as a "thank you" or "confirmation" page to the user's client device. Generally, these pages are hosted by a third-party website that is displayed to a user to confirm the completion of a desired action. In particular embodiments, the page includes a conversion tracking tag which may be a code snippet or segment (e.g., one or more of JavaScript and HTML) that is configured to, when the conversion page is executed or rendered by the user's client device, to make a call or transmit a request or message to social-networking system 160 to inform social-networking system 160 of the particular action. In particular embodiments, an executable JavaScript code snippet may cause a tracking pixel to be generated in the conversion page. Alternately, an iFrame, <img> tag or other HTML code may be used to generate such a tracking pixel. The tracking pixel may then be communicated to social-networking system 160 as a result of executing the code snippet. In particular embodiments, the tracking pixel includes parameters such as, the user ID of the user (as it is registered with social-networking system 160), an ID for the third-party website, a product or service ID, product or service information concerning the product or service purchased by the user on the third-party website, as well as timestamp information indicating when the action was taken (e.g., product or service was purchased).

In particular embodiments, these parameters are logged by social-networking system 160, analyzed, and can be correlated to logged advertisement history, especially logged advertisements previously displayed to the user (impressions) or clicked-on by the user (click-through), including those that may have been advertising the product or service the user purchased. In particular embodiments, social-networking system 160 may track a number of types of conversions in a conversion log, which may be a separate log devoted to tracking actions having corresponding advertisements. By way of example, in particular embodiments, social-networking system 160 tracks both post-impression and post-click conversions. Post-click conversions are from users who have clicked on an ad associated with the tracking tag. Post-impression conversions are from users who have seen, either on the third-party website or on a page of social-networking system 160, but didn't necessarily click on an associated ad.

In particular embodiments, the advertising history logged by the social-networking system 160, which may be analyzed and correlated for a particular user based on his or her user ID, may be further correlated with conversion tracking; that is, for example, using cookies set at the user's client device by the social-networking system 160 to determine which ads the user actually clicked on (click-through) as opposed to those which were displayed but not clicked on (impressions) by the user. In this way, using conversion tracking as well as action tracking based on information obtained from (directly or indirectly) third-party websites, the social-networking system 160 may correlate this data over a suitable time window and determine a likelihood of whether particular ads or ad campaigns, whether clicked-on or simply displayed to a particular user, ultimately motivated that user to actually purchase the advertised product or participate in an advertised activity from the third-party website. Such information may also be combined with information from the user's friends to develop recommendations or to tailor ads to be targeted to the user or the user's friends. In other words, social-networking system 160 performs conversion tracking and action logging (with the help of third-party websites) to populate a rich data pool that may then be used to quantitatively gauge the effectiveness of selected advertisements and advertising methods displayed to users of the social-networking system 160, as well as to develop, provide recommendations for, or target particular ads to particular users.

In particular embodiments, these actions taken by the user or other users in the user's network are actions on a third-party website other than social-networking system 160. The actions taken on a different or third-party website upon which an ad may be based may include any action that an advertiser might want to use in an advertisement directed to someone's connections on social-networking system 160. For example, the action may include purchases of a product or gift card, placing a product in an online shopping cart or wishlist of a website, moving an item from the wishlist to the online shopping cart, registering for a service offered by the third-party website, or any other suitable action for logging.

In particular embodiments, the third-party website than social-networking system 160 may facilitate this communication of information in social-networking system 160. For example, the third-party website may detect certain actions taken by a user on that website, and then determine whether the user is a user of social-networking system 160. If so, in particular embodiments, the third-party website communicates this information to a user's client computing device, which then may communicate a reporting message to social-networking system 160 to communicate the action taken by the user of social-networking system 160 at third-party system 170. More particularly, as described above, the third-party website may embed an executable conversion tracking tag in the form of a code snippet or segment such as a JavaScript call, or, alternately, an IFrame or HTML code segment, that, in some embodiments, generates or constructs a image tag or tracking pixel (e.g., a 1 by 1 pixel), and that includes parameters such as the user's ID, information about the third-party website, information about the product looked at or purchased, as well as timestamp information, all of which may then be transmitted to social-networking system 160.

In particular embodiments, third-party websites may generate conversion tracking tags specific to the third-party website. For example, in certain embodiments, the third-party website (e.g., an advertiser) registers with the social-networking system 160 and generates, in conjunction with social-networking system 160, a conversion tracking tag (e.g., a JavaScript code snippet or segment, an image tag or tracking pixel) that may include such parameters as, for example, a tag name/identifier, a type of conversion event the third-party wishes to track, and a conversion value (a third-party-defined numerical value associated with a purchase, lead, or other conversion action), among other possibilities. The tag is then registered with social-networking system 160 and then also pasted, embedded, or otherwise included into the third-party website's conversion pages, such as confirmation pages or landing pages, that the third-party web site transmits to users who have completed certain defined conversion actions or events. In particular embodiments, a conversion tracking tag may be associated with and/or registered with two or more third-party websites.

In a particular implementation, the third-party website uses an <img> or other tag as an advertising pixel that points to an endpoint at the social-networking system 160 (e.g., facebook.com/impression.php). The URL generated for each pixel can be made unique by a tracking ID and a hash of the tracking ID. At creation time, the advertiser is prompted to set a category for the pixel, like "purchase" or "sign-up", to facilitate reporting on the pixels and aggregate across advertisers. As discussed above, the advertiser can optionally supply additional info that is meaningful to it: sku and value. These metrics can be used for grouping and summing respectively in advertiser-facing reports. To ensure that pixels are requested on every page load of the host page, the following HTTP headers can be set: cache-control: no-cache; expires: time( )-1.

Alternatively, advertisers may use JavaScript embedded into their conversion landing pages. The snippet may look like this:

```
<script language="JavaScript"
src="http://static.ak.facebook.com/connect.php/
AdConversionTracking"></script>
<script language="JavaScript" type="text/javascript">
<!--
var fb_conversion_tracking_params = {
'id' : 23498234,
'hash' : '324fe3234c',
'type' : 'Purchase'
'sku' : '334-E2-234',
'value' : 1
};
FB.trackConversion(fb_conversion_tracking_params);
//--></script>
```

The JS script tag can automatically pull in any additional information and generate an <img> tag to point to <img src="http://www.facebook.com/impression.php> and pass in desired parameters.

Conversion tracking tags may be placed by the third-party website in a number of suitable desired locations of the conversion page. By way of example, by placing the tracking tag before the closing <body> tag on a web page, this will ultimately inform social-networking system 160 that it is supposed to track visits to that page. As another example, to track individual purchases, downloads, and registrations, the conversion tracking tag can be placed into the conversion page on the third-party website that loads directly after the action to be tracked. In such an example, the tag may be placed in the HTML code right before the closing </body> text. In other embodiments, it may be desirable to track a series of page views leading to a conversion action. To do this, a tracking tag may be placed at all pages leading to a possible conversion. Then, the third-party website may simply specify different SKU values for each page, by way of example, with a tag with one SKU value on you homepage, another on the product page, one more in the shopping cart, and another to reflect actual purchases on the confirmation purchase page.

In particular embodiments, social-networking system 160 may analyze this conversion data to determine more effective ways of targeting advertising. Rather than simply deliver an advertisement that is targeted to a particular user based on the user's preferences (e.g., those declared by the user in the user's profile page), particular embodiments present advertisements that are based on the user's history and habits of converting advertisements presented to them on social-networking system 160. For instance, as described above, social-networking system 160 may determine one or more parameters (e.g., when, where (e.g., at home vs. at work), and how (e.g., on which platform)) associated with a user's previous conversions, and analyze those parameters to determine those that are most correlated with the user. The analysis may include a determination of which parameters are most utilized by the user in the conversion data. For instance, if a user converts more at home than at the office (e.g., as determined by location data associated with the conversion), then future advertisements may be sent to the user when the user accesses social-networking system 160 at home. Similarly, if a user converts more using their smartphone than their desktop computer (e.g., based on data from device-detection system 180), then future advertisements may be sent to the user when the user accesses social-networking system 160 on the smartphone than on the desktop computer.

Figure 3:
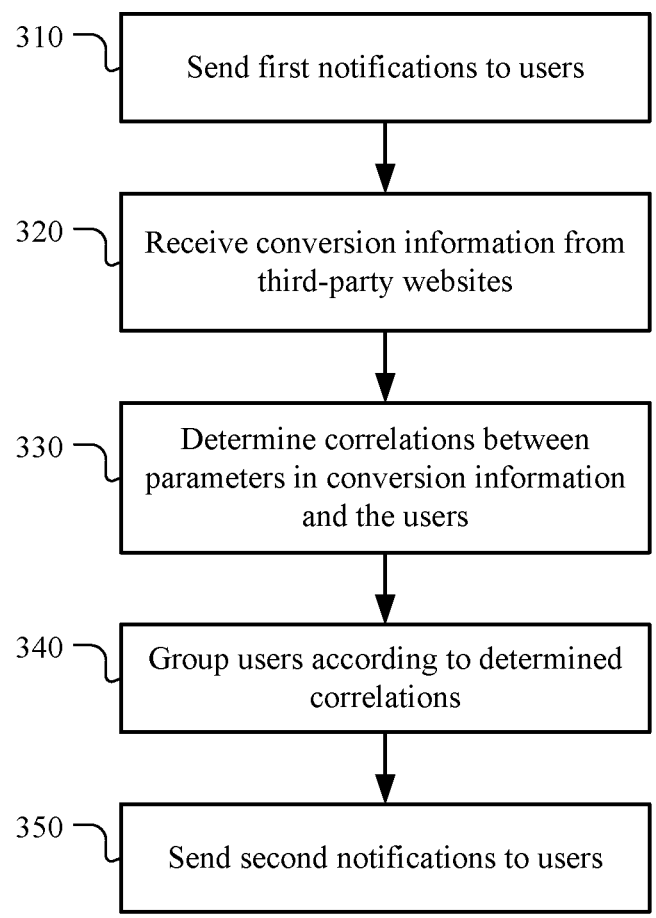
FIG. 3 illustrates an example method for sending notifications to users based on the users' activity on third-party sites.

FIG. 3 illustrates an example method 300 for sending notifications to users based on the users' activity on third-party websites. For ease of reference, method 300 is described below with respect to certain devices in network environment 100 of FIG. 1. However, it will be understood that the steps of method 100 may be performed by any suitable device in a network environment in accordance with the present disclosure. Method 300 may be performed by executing software or other instructions embodied in a computer-readable medium using one or more processors embodied by a computing device or devices of the system (e.g., a computer system similar to computer system 400 of FIG. 4). Particular embodiments may repeat one or more steps of the method of FIG. 3, where appropriate.

The method may begin at step 310, where social-networking system 160 sends a first set of notifications to its users. The notifications may be advertisements in particular embodiments. The advertisements may be generated by an ad server (e.g., ad server 162) running on social-networking system 160. The advertisements may be of any suitable type or format as described above, and may promote certain products or services offered by third-party websites (or may promote the third-party website itself).

At step 320, social-networking system 160 receives conversion information from the third-party websites hosted on third-party system 170. The conversion information may be of any suitable format, such as a tracking pixel, image tag or others described herein. The conversion information may include information regarding the users' activity on the third-party websites. In particular, the conversion information may include information that relates to the users' activity on the site in response to the notifications sent at step 310. For example, a user may click-through an advertisement presented and proceed to a third-party website. The user may then perform one or more actions on the website, such as purchasing an item sold by the website, and the conversion information may include information regarding the purchase of the item. Other types of conversion activities may include using a coupon code on the third-party web site, placing an item in a wishlist of the third-party web site, moving an item from a wishlist to an online shopping cart on the third-party website, or placing an item in an online shopping cart of the third-party website. The conversion information may also comprise information related to the user's conversion on the third-party website, such as information regarding a time, day, or date of the purchase, the user's relative location at the time of the purchase, and a platform on which the user made the purchase. In certain embodiments, the information may be in the form of parameters included in a message sent to social-networking system 160 by third-party system 170.

At step 330, social-networking system 160 determines correlations between the parameters of the conversion information and the users. This may include determining a highest-utilized parameter of the one or more parameters for each user, in certain embodiments. In particular embodiments, determining the correlations between the parameters and the users includes determining a preferred time period for a particular activity. In particular embodiments, determining the correlations between the parameters and the users includes determining a preferred platform for a particular activity. In particular embodiments, determining the correlations between the parameters and the users comprises determining a preferred geolocation for a particular activity. In particular embodiments, the correlations may be determined for specific time periods (e.g., the most recent two days or two weeks). The time periods may be selected by social-networking system 160 or by the entity providing the notification to social-networking system 160.

At step 340, social-networking system 160 groups users based on their conversion behavior. This may include assigning each user (or a subset of users) to one or more particular groups based on correlations determined at step 330. For instance, this may include assigning a first set of users to a first group and assigning a second set of users to a second group.

Finally, at step 350, social-networking system 160 sends a second set of notifications to its users. The second set of notifications may be based on the correlations determined at step 330 and/or the assigned groups from step 340. The notifications may be tied to advertisements in particular embodiments. The advertisements may be generated by an ad server (e.g., ad server 162) running on social-networking system 160. The advertisements may be of any suitable type or format as described above, and may promote certain products or services offered by third-party websites (or may promote the third-party website itself). In embodiments where a preferred time period for users is determined at step 330, the second notifications may be sent to users during their respective preferred time periods. In embodiments where a preferred platform is determined at step 330, the second notifications may be sent to users on their respective preferred platforms. In embodiments where a preferred geolocation is determined at step 330, the second notifications may be sent to when users are determined to be at or approximately near to their respective preferred geolocations.

Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for sending notifications to users based on the users' activity on third-party websites including the particular steps of the method of FIG. 3, this disclosure contemplates any suitable method for sending notifications to users based on the users' activity on third-party websites including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
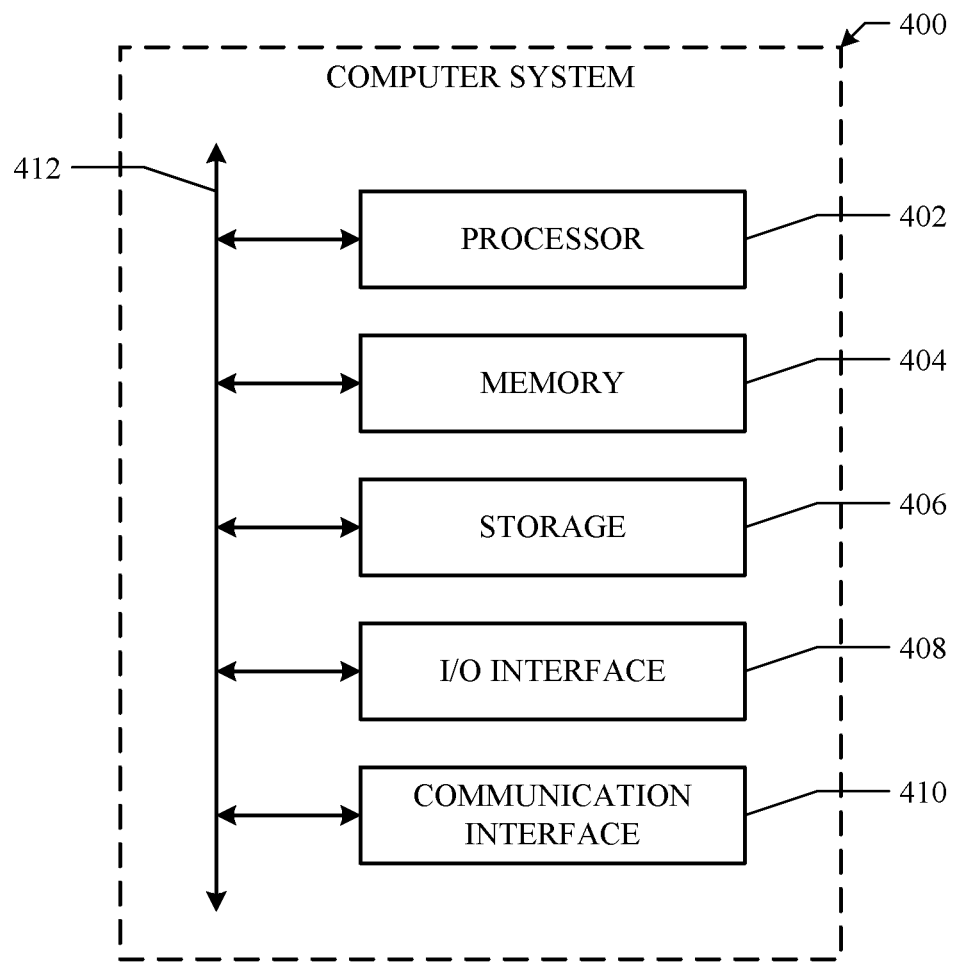
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by one or more computing device of an online social network, registering code segments, wherein one of the code segments is embedded into a confirmation, transmitted from a third-party website to a client device associated with a user of the online social network, of an action the user takes on the third-party website, and wherein the embedded code segment causes the client device to send one or more parameters associated with the action to the one or more computing devices;
   by the one or more computing devices, receiving, from one or more client devices executing one or more of the code segments, information regarding one or more actions taken on the third-party website by one or more respective first users of the online social network, the information comprising one or more parameters associated with each of the actions, wherein the one or more actions comprise: using a coupon code, placing an item in a wishlist, moving an item from a wishlist to an online shopping cart, placing an item in an online shopping cart, or purchasing an item;
   by the one or more computing devices, determining one or more correlations between the one or more parameters and a second user of the online social network, wherein determining the one or more correlations between the one or more parameters and the second user comprises determining a preferred time period for a particular action;
   by the one or more computing devices, assigning the second user to one or more groups based on the determined one or more correlations, wherein each of the one or more groups is associated with a notification; and
   by the one or more computing devices, sending, to a client system associated with the second user, one or more notifications corresponding to the one or more groups, wherein sending the one or more notifications comprises sending one of the one or more notifications associated with the particular action during the preferred time period.

2. The method of claim 1, wherein the one or more parameters comprise: a user's geolocation, a time of day, a day of the week, a date, or an indication of a platform on which the activity took place.

3. The method of claim 1, wherein determining the one or more correlations between the one or more parameters and the second user comprises determining a highest-utilized parameter of the one or more parameters.

4. The method of claim 1, wherein:
   determining the one or more correlations between the one or more parameters and the second user comprises determining a preferred platform for a particular action; and
   sending, to the client system associated with the second user, the one or more notifications comprises sending one of the one or more notifications associated with the particular action on the preferred platform.

5. The method of claim 1, wherein:
   determining the one or more correlations between the one or more parameters and the second user comprises determining a preferred geolocation for a particular action; and
   sending, to the client system associated with the second user, the one or more notifications comprises sending one of the one or more notifications associated with the particular action when a user is determined to be near the preferred geolocation.

6. The method of claim 1, wherein the information regarding the actions comprises a tracking pixel or image tag.

7. The method of claim 1, further comprising:
   sending one or more initial notifications to the one or more first users of the online social network, the one or more initial notifications including links to the third-party website, wherein the information regarding the one or more actions taken by the one or more respective first users of the online social network comprise information regarding actions taken in response to the one or more initial notifications.

8. One or more computer-readable non-transitory storage media embodying software that is operable when executed, by one or more computing devices, to:
   register code segments, wherein one of the code segments is embedded into a confirmation, transmitted from a third-party website to a client device associated with a user of an online social network, of an action the user takes on the third-party website, and wherein the embedded code segment causes the client device to send one or more parameters associated with the action to the one or more computing devices;
   receive, from one or more client devices executing one or more of the code segments, information regarding one or more actions taken on the third-party website by one or more respective first users of an online social network, the information comprising one or more parameters associated with each of the actions, wherein the one or more actions comprise: using a coupon code, placing an item in a wishlist, moving an item from a wishlist to an online shopping cart, placing an item in an online shopping cart, or purchasing an item;
   determine one or more correlations between the one or more parameters and a second user of the online social network, wherein determining the one or more correlations between the one or more parameters and the second user comprises determining a preferred time period for a particular action;
   assigning the second user to one or more groups based on the determined one or more correlations, wherein each of the one or more groups is associated with a notification; and
   send, to a client system associated with the second user, one or more notifications corresponding to the one or more groups, wherein sending the one or more notifications comprises sending one of the one or more notifications associated with the particular action during the preferred time period.

9. The media of claim 8, wherein the one or more parameters comprise: a user's geolocation, a time of day, a day of the week, or an indication of a platform on which the activity took place.

10. The media of claim 8, wherein determining the one or more correlations between the one or more parameters and the second user comprises determining a highest-utilized parameter of the one or more parameters.

11. The media of claim 8, wherein:
determining the one or more correlations between the one or more parameters and the second user comprises determining a preferred platform for a particular action; and
sending, to the client system associated with the second user, the one or more notifications comprises sending one of the one or more notifications associated with the particular action on the preferred platform.

12. The media of claim 8, wherein:
determining the one or more correlations between the one or more parameters and the second user comprises determining a preferred geolocation for a particular action; and
sending, to the client system associated with the second user, the one or more notifications comprises sending one of the one or more notifications associated with the particular action when a user is determined to be near the preferred geolocation.

13. A system comprising: one or more processors; and a memory coupled to the processors comprising instructions executable by the processors, the processors being operable when executing the instructions to:
register code segments, wherein one of the code segments is embedded into a confirmation, transmitted from a third-party website to a client device associated with a user of an online social network, of an action the user takes on the third-party website, and wherein the embedded code segment causes the client device to send one or more parameters associated with the action to the system;
receive, from one or more client devices executing one or more of the code segments, information regarding one or more actions taken on the third-party website by one or more respective first users of an online social network, the information comprising one or more parameters associated with each of the actions, wherein the one or more actions comprise: using a coupon code, placing an item in a wishlist, moving an item from a wishlist to an online shopping cart, placing an item in an online shopping cart, or purchasing an item;
determine one or more correlations between the one or more parameters and a second user of the online social network, wherein determining the one or more correlations between the one or more parameters and the second user comprises determining a preferred time period for a particular action;
assigning the second user to one or more groups based on the determined one or more correlations, wherein each of the one or more groups is associated with a notification; and
send, to a client system associated with the second user, one or more notifications corresponding to the one or more groups, wherein sending the one or more notifications comprises sending one of the one or more notifications associated with the particular action during the preferred time period.

* * * * *